(12) United States Patent
Mizuno

(10) Patent No.: US 10,532,638 B2
(45) Date of Patent: Jan. 14, 2020

(54) MOUNTING STRUCTURE FOR MOUNTING INTERIOR COMPONENT

(71) Applicant: TOYOTA BOSHOKU KABUSHIKI KAISHA, Aichi (JP)

(72) Inventor: Yuki Mizuno, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/173,671

(22) Filed: Oct. 29, 2018

(65) Prior Publication Data

US 2019/0135092 A1 May 9, 2019

(30) Foreign Application Priority Data

Nov. 7, 2017 (JP) .................... 2017-214401

(51) Int. Cl.
*B60J 5/04* (2006.01)
*B60R 13/02* (2006.01)

(52) U.S. Cl.
CPC ........... *B60J 5/0437* (2013.01); *B60J 5/0444* (2013.01); *B60J 5/0451* (2013.01); *B60R 13/0243* (2013.01)

(58) Field of Classification Search
CPC ...... B60J 5/0437; B60J 5/0444; B60J 5/0451; B60R 13/0243
USPC ...................................................... 296/146.7
See application file for complete search history.

(56) References Cited

U.S. PATENT DOCUMENTS

| 4,728,143 A * | 3/1988 | Tanino ...................... B60J 5/04 296/146.7 |
| 8,292,344 B2 * | 10/2012 | Yamaguchi ............ B60J 5/0468 296/1.02 |
| 8,840,169 B2 * | 9/2014 | Tanizawa ............ B60R 13/0206 296/146.7 |

FOREIGN PATENT DOCUMENTS

JP 2014031110 2/2014

\* cited by examiner

*Primary Examiner* — Joseph D. Pape
(74) *Attorney, Agent, or Firm* — Greenblum & Bernstein, P.L.C.

(57) ABSTRACT

A mounting structure for mounting an interior component to a door trim body includes: a rear locking protrusion including a first portion protruding from a back surface of the interior component and a second portion extending from a distal end of the first portion toward a front of a vehicle; a rear mounting hole in a rear edge section of the door trim body and opposed to the rear locking protrusion; a locking protrusion protruding from the back surface toward the door trim body and is disposed closer to a front of the vehicle relative to the rear locking protrusion; and a mounting hole in a section of the door trim body at a position closer to the front relative to the rear mounting hole and opposed to the locking protrusion. The second portion of rear locking protrusion is locked to a hole edge of the rear mounting hole.

10 Claims, 8 Drawing Sheets

MOUNTING STRUCTURE FOR MOUNTING INTERIOR COMPONENT

CROSS REFERENCE TO RELATED APPLICATION

This application claims priority from Japanese Patent Application No. 2017-214401 filed on Nov. 7, 2017. The entire contents of the priority application are incorporated herein by reference.

TECHNICAL FIELD

The technology described herein relates to a mounting structure for mounting an interior component.

BACKGROUND

A known mounting structure for mounting a grip cover to a door trim body includes locking portions that are inserted in through holes in the door trim body and locked to hole edges of the through holes on a back surface of the door trim body opposed to a door panel. The locking portions are included in a peripheral edge section of the grip cover.

Interior components including grip covers are expected to add decorative aspects to door trims and to provide proper levels of safety depending on shapes and locations. Mounting structures for mounting interior components having elongated shapes that extend in the front-rear direction of vehicles are expected to be properly fixed to door trim bodies without special parts such as tether clips. Mounting structures for mounting interior components to door trim bodies in vehicles including side airbags need to be configured such that the interior components do not obstruct deployment of the airbags even if the interior components come off the door trim panels in collisions.

SUMMARY

The technology described herein was made in view of the foregoing circumstances. An object is to provide a mounting structure for mounting an interior component which contributes driver and passenger safety in collisions.

A technology described herein is related to a mounting structure for mounting an interior component having an elongated shape with a long dimension in a front-rear direction of a vehicle to a door trim body in the vehicle. The mounting structure comprising includes at least one rear locking protrusion, at least one rear mounting hole, at least one locking protrusion, and at least one mounting hole. The rear locking protrusion includes a first portion that protrudes from a back surface of the interior component opposed to the door trim body and a second portion that extends from a distal end of the first portion toward a front of the vehicle. The rear locking protrusion is disposed closer to a rear edge of the interior component. The rear mounting hole is in a rear edge section of the door trim body at a position closer to the rear of the vehicle and opposite the at least one rear locking protrusion. The locking protrusion protrudes from the back surface of the interior component at a position closer to a front of the vehicle relative to the at least one rear locking protrusion. The mounting hole is in a section of the door trim body at a position closer to the front of the vehicle relative to the at least one rear mounting hole and opposite the at least one locking protrusion. The first portion of the rear locking protrusion is disposed in the at least one rear mounting hole and the second portion of the rear locking protrusion is locked to a hole edge of the rear mounting hole. The locking protrusion is disposed in the mounting hole and locked to a hole edge of the at least one mounting hole. The locking protrusion has flexibility to deform during insertion of the locking protrusion in the mounting hole with the rear locking protrusion disposed in the rear mounting hole and to return to an original state thereof after passed through the mounting hole.

In case of a side collision, a force may be applied to the door trim body from the exterior side to the interior side and then to the interior component. The locking protrusion may be deformed and removed from the mounting hole. According to the mounting structure described above, even in such a case, the rear locking protrusion remains in the rear mounting hole. Namely, the interior component comes off the door trim body as intended. Furthermore, because a rear portion of the interior component is less likely to come off the door trim body, the interior component is less likely to obstruct deployment of a side airbag disposed closer to the rear of the vehicle relative to the interior component. The mounting structure controls the removal of the interior component.

According to the technology described herein, a mounting structure for mounting an interior component which contributes driver and passenger safety in collisions can be provided.

DETAILED DESCRIPTION

Figure 1:
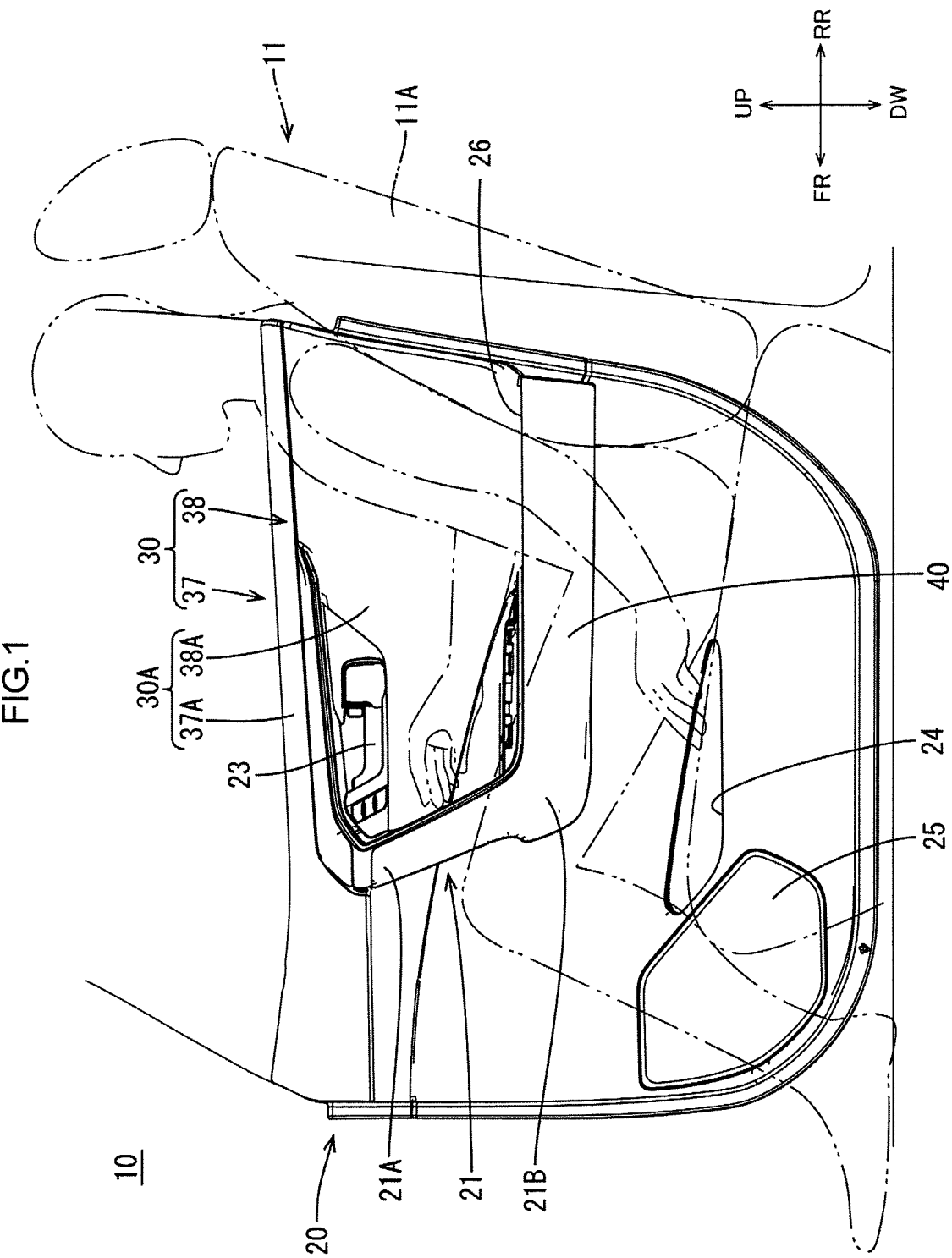
FIG. 1 is a side view illustrating a part of a vehicle interior including a door trim according to an embodiment.

An embodiment will be described with reference to FIGS. 1 to 8. In this section, a mounting structure for mounting an interior component 40 to a door trim 20 of a vehicle door 10 will be described. In the drawings, arrows are present. Letters FR, RR, UP, DW, IN and OUT indicate the front, the rear, the top, the bottom, the interior, and the exterior of the vehicle, respectively.

As illustrated in FIG. 1, the vehicle door 10 lateral to a seat 11 includes a door panel 12 (see FIG. 7) and the door trim 20 that is fixed to the front side of the door panel 12 facing a vehicle interior. The door panel 12 includes an inner panel and an outer panel prepared by pressing metal sheets made of iron or aluminum into predefined shapes and fixing the shaped metal sheet together. The seat 11 includes a backrest 11A in which a side airbag is installed. The side airbag well be deployed from a side of the backrest 11A facing the door trim 20 toward the front of the vehicle.

As illustrated in FIG. 1, the door trim 20 includes a door trim body 30 that includes a trim board 37 and an ornament board 38. The door trim body 30 has a rectangular outline and includes a front surface 30A that faces the vehicle interior. The door trim body 30 is in a vertical position such that the front surface 30A extends in the front-rear direction and the top-bottom direction of the vehicle.

Figure 5:
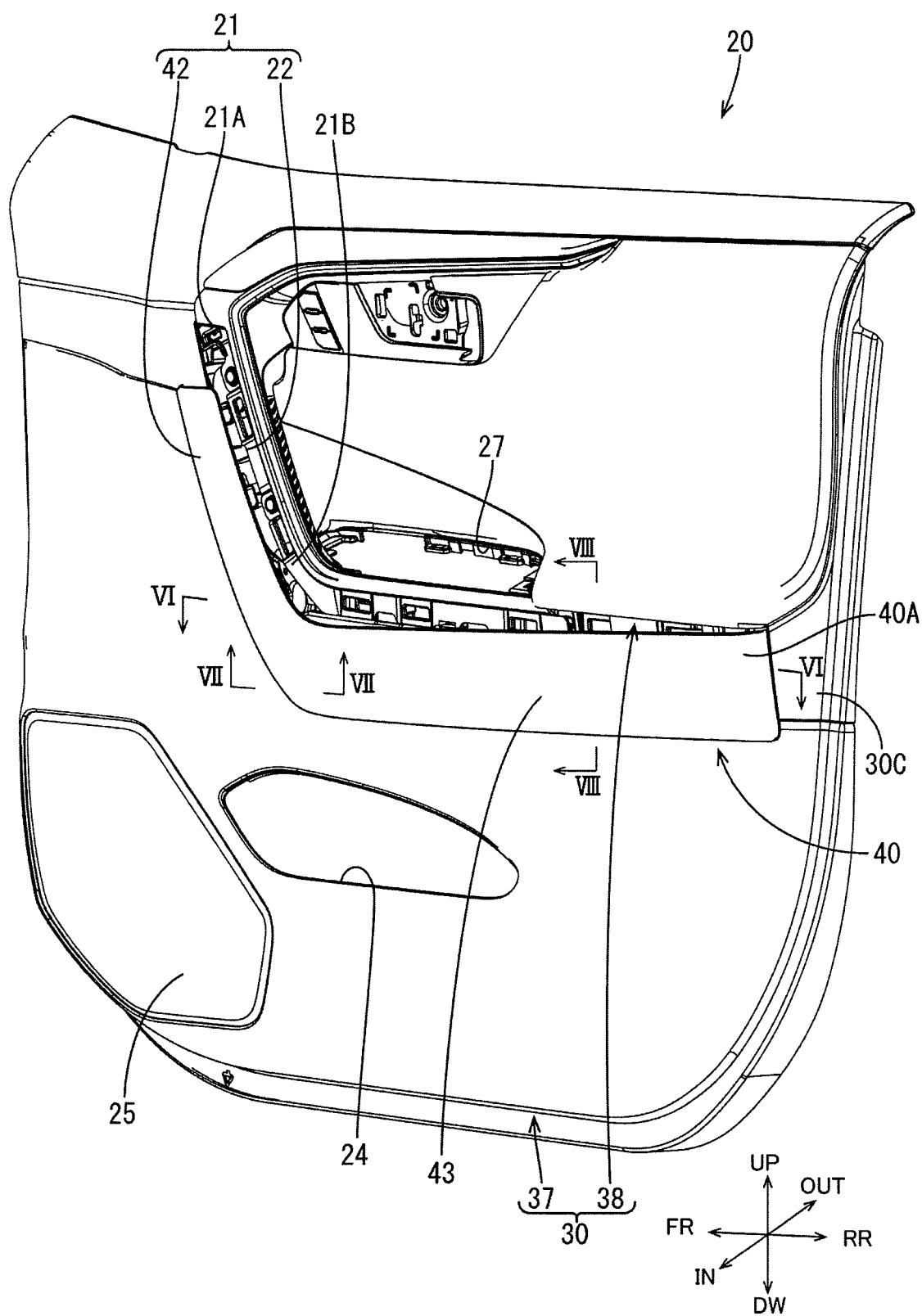
FIG. 5 is a perspective view illustrating a mounting structure for mounting the interior component.

As illustrated in FIG. 1, the door trim 20 is provided with functional features including a door grip 21, an inside handle 23, a door pocket 24, a speaker grille 25, and an armrest 26. The armrest 26 protrudes from the door trim body 30 toward the inner side of the vehicle interior. As illustrated in FIG. 5, the door trim body 30 includes a hole 27 in front of the armrest 26. A switch base is fitted in the hole 27.

As illustrated in FIG. 1, the door grip 21 is disposed at a middle section of the front surface 30A of the door trim body 30 with respect to the front-rear direction of the vehicle. The door grip 21 has an elongated shape that is sloped toward the rear of the vehicle.

As illustrated in FIG. 5, the door grip 21 includes a grip base 22 and a grip cover portion 42 that covers the grip base 22 from the interior of the vehicle interior. The grip base 22 is a portion of the trim board 37. The grip cover portion 42 is a portion of the interior component 40.

Figure 2:
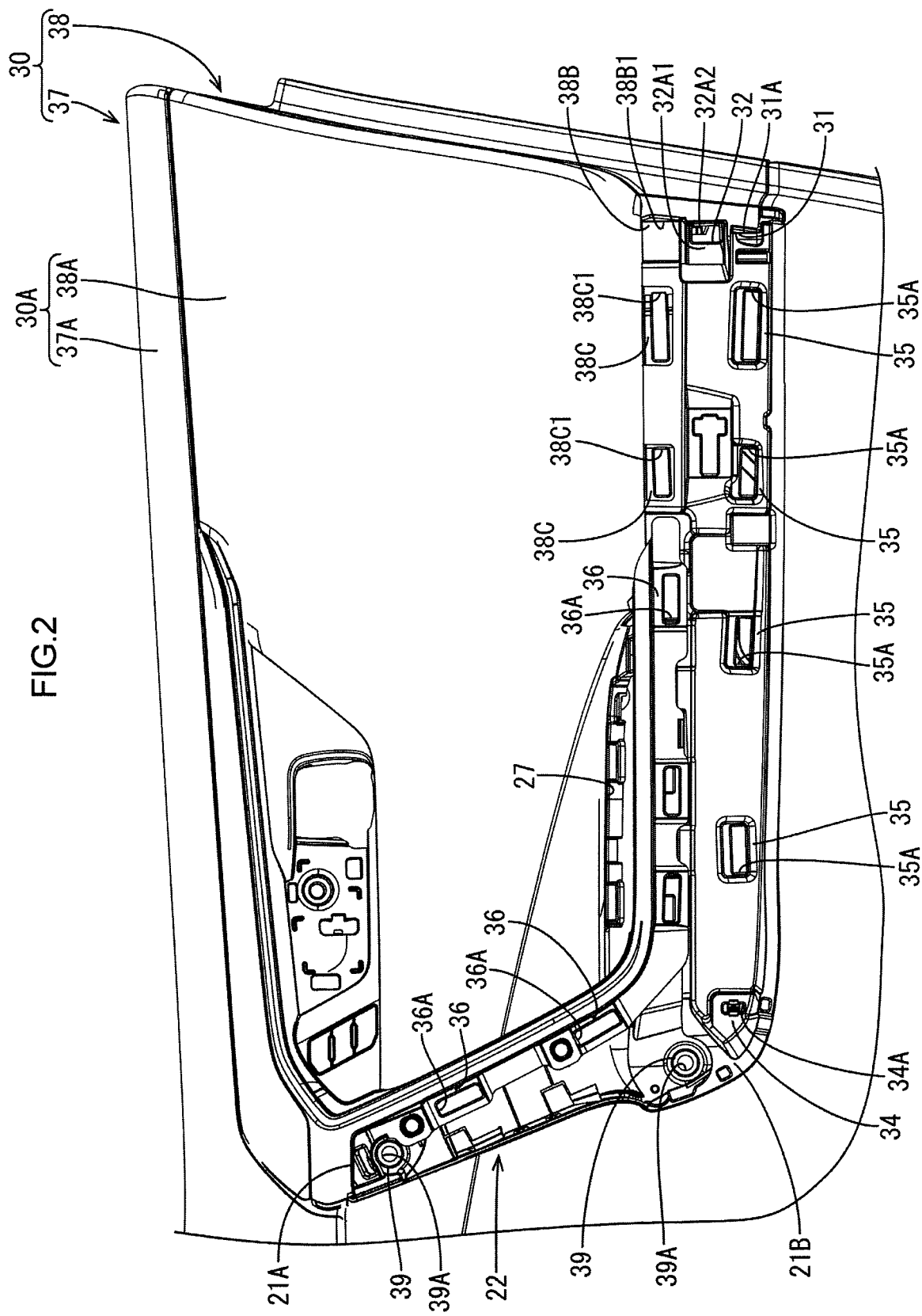
FIG. 2 is a magnified elevation view illustrating the front side of a portion of a door trim body.

As illustrated in FIG. 2, the grip base 22 is disposed on an outer side of the vehicle interior relative to the grip cover portion 42. The grip base 22 has an elongated shape. The grip base 22 is integrally formed with the door trim body 30 to decline toward the rear of the vehicle with a space between the front surface 30A of the door trim body 30 so that a passenger can insert his or her finger or hand in the space.

Figure 7:
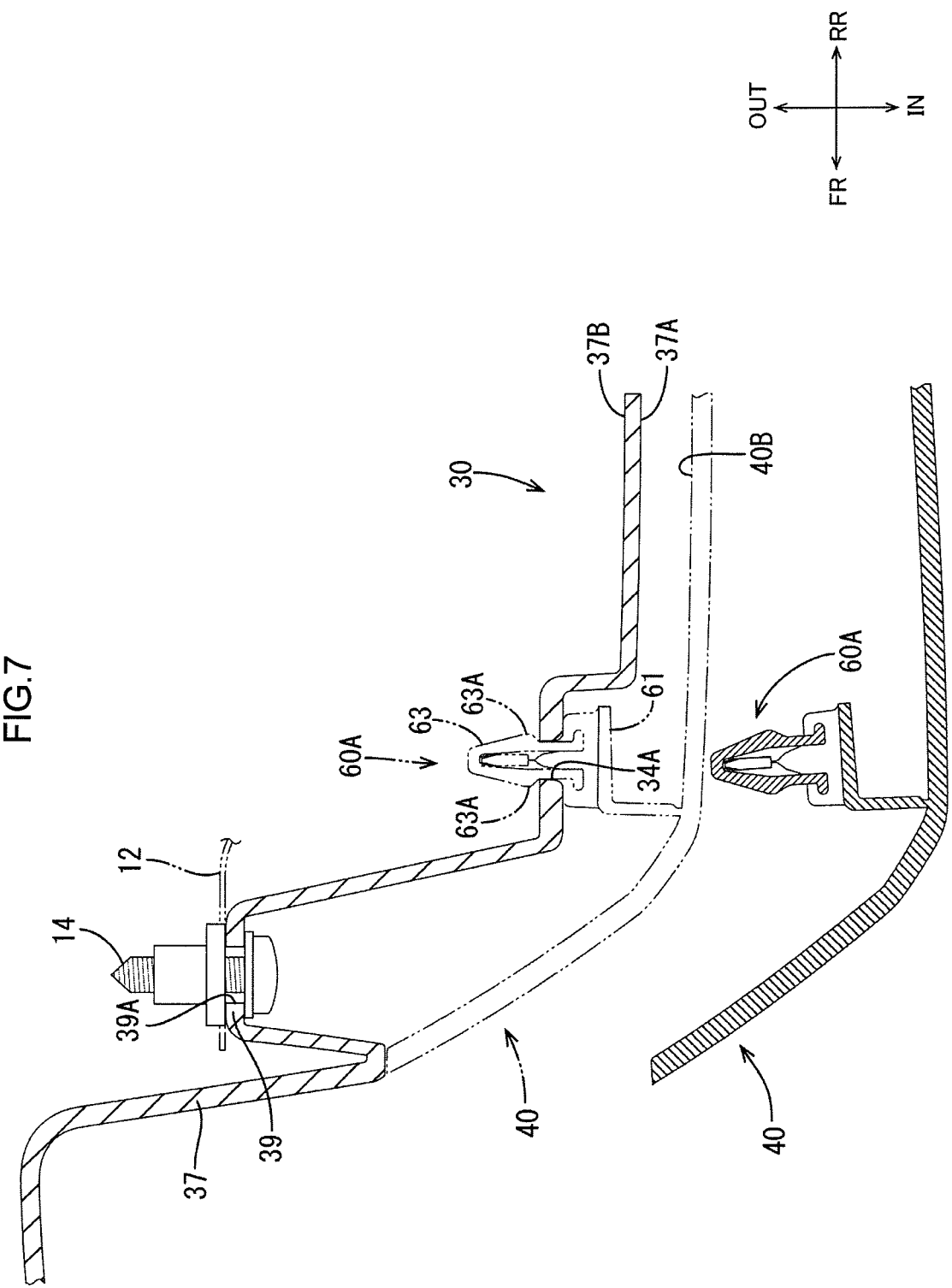
FIG. 7 is a cross-sectional view along line VII-VII in FIG. 5 illustrating a section of a vehicle door including a locking protrusion and a mounting hole.

As illustrated in FIGS. 2 and 7, the trim board 37 includes fixing portions 39 at positions opposed to an upper end section 21A and a lower end section 21B of the door grip 21, respectively. The fixing portions 39 include insertion holes 39A with openings in surfaces of the fixing portions 39 opposed to the door panel 12. Screws 14 are inserted in the respective insertion holes 39A and fixed to the door panel 12. With the fixing portions 39 and the screws 14, the door trim body 30 is fixed to the door panel 12 and thus a force applied to the door grip 21 is received by the door panel 12. According to the configuration, the door grip 21 has adequate strength so that a passenger can hold the door grip 21 to open and close the vehicle door 10 or hold his or her body position.

As illustrated in FIG. 1, the trim board 37 and the ornament board 38 include a trim board front surface 37A and an ornament board front surface 38A, respectively. The trim board front surface 37A and the ornament board front surface 38A define the front surface 30A of the door trim body 30. The ornament board front surface 38A includes a design surface that adds a decorative feature to the front surface 30A of the door trim body 30.

As illustrated in FIG. 5, the interior component 40 is attached to the door trim body 30 from the interior side to cover the fixing portions 39. The interior component 40 has a function for covering the fixing portions 39 from the interior side and a function for adding a decorative feature to the door trim 20. Because the interior component 40 is a component for covering the fixing portions 39, the interior component 40 is attached to the door trim body 30 after the door trim body 30 is fixed to the door panel 12.

Figure 3:
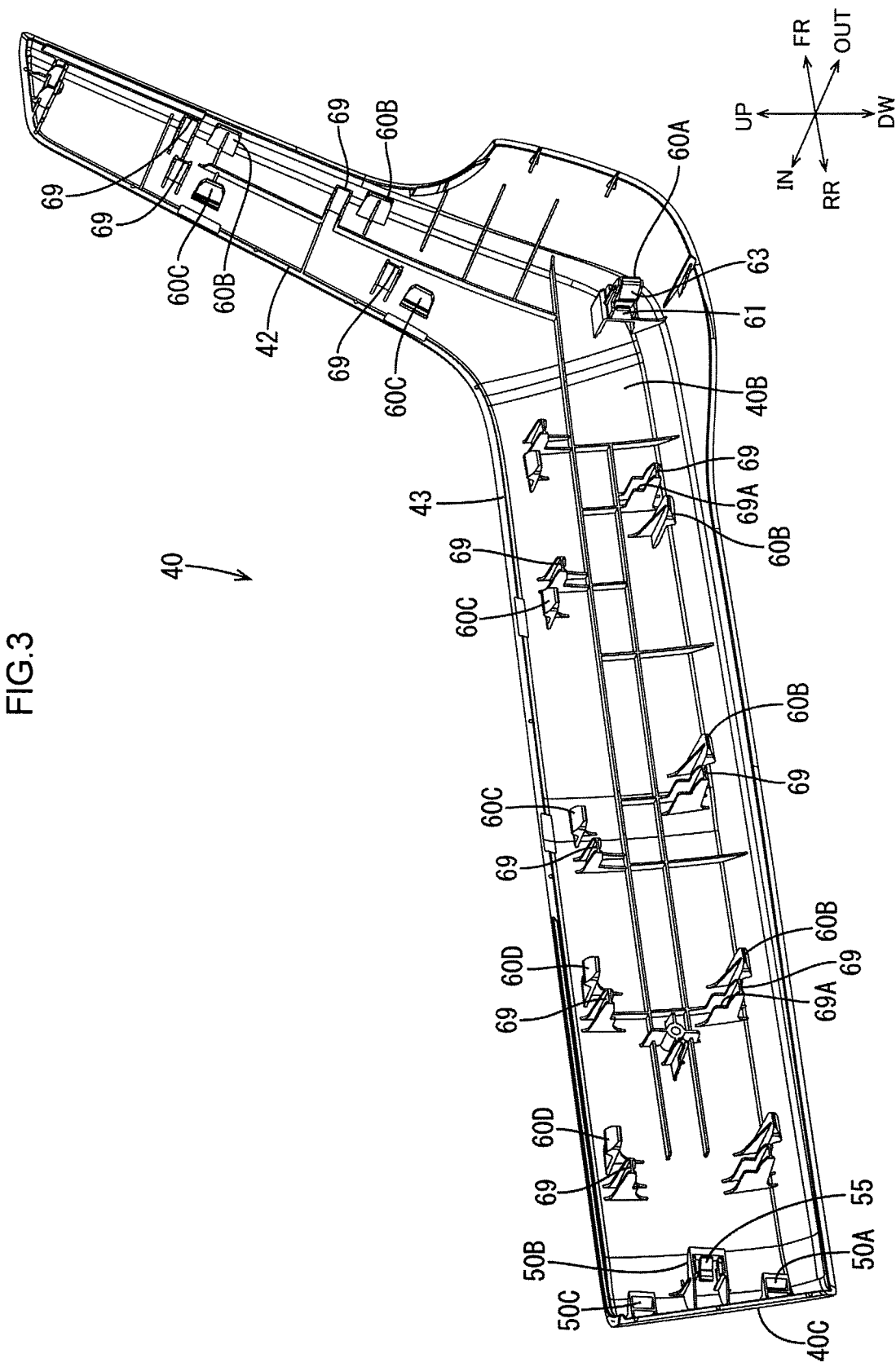
FIG. 3 is a perspective view of the back side of an interior component.

As illustrated in FIG. 3, the interior component 40 has an elongated shape that extends in the front-rear direction of the vehicle. The interior component 40 includes the grip cover portion 42 and a base portion 43. The grip cover portion 42 defines a front surface of the door grip 21 opposite from the front surface 30A of the door trim body 30. The grip cover portion 42 is disposed to decline toward the rear of the vehicle. The base portion 43 extends from a lower edge of the grip cover portion 42 toward the rear of the vehicle. The grip cover portion 42 and the base portion 43 are coupled to form an L shape, that is, a design portion of the door trim 20. The front surface of the interior component 40 will be referred to as an interior component front surface 40A.

The interior component 40 includes a back surface that faces the door trim body 30. The back surface of the interior component 40 will be referred to as an interior component back surface 40B. The interior component 40 includes an interior component rear edge 40C located closer to the rear of the vehicle, an interior component upper edge 40D, and an interior component lower edge 40E.

When a passenger in the vehicle interior holds the door grip 21 to close the vehicle door 10, a force is applied to the grip cover portion 42 in a direction to twist the grip cover portion 42 about an axis that is along the longitudinal direction of the grip cover portion 42. With the base portion 43, the force can be spread at a junction of the base portion 43 with the door trim body 30. Therefore, a gap is less likely to be created between the grip cover portion 42 and the door trim body 30 due to the force exerted on the door grip 21. The grip cover portion 42 is less likely to come off the door trim body 30.

As illustrated in FIG. 3, the interior component 40 includes a rear locking protrusion set 50 disposed closer to the interior component rear edge 40C and a locking protrusion set 60 disposed farther from the interior component rear edge 40C relative to the rear locking protrusion set 50. The rear locking protrusion set 50 includes a first rear locking protrusion 50A, a second rear locking protrusion 50B, and a third rear locking protrusion 50C that protrude from the interior component back surface 40B. The first rear locking protrusion 50A, the second rear locking protrusion 50B, and the third rear locking protrusion 50C are disposed along the interior component rear edge 40C. The locking protrusion set 60 includes a first locking protrusion 60A, second locking protrusions 60B, third locking protrusions 60C, and fourth locking protrusions 60D that protrude from the interior component back surface 40B toward the door trim body 30.

Figure 4:
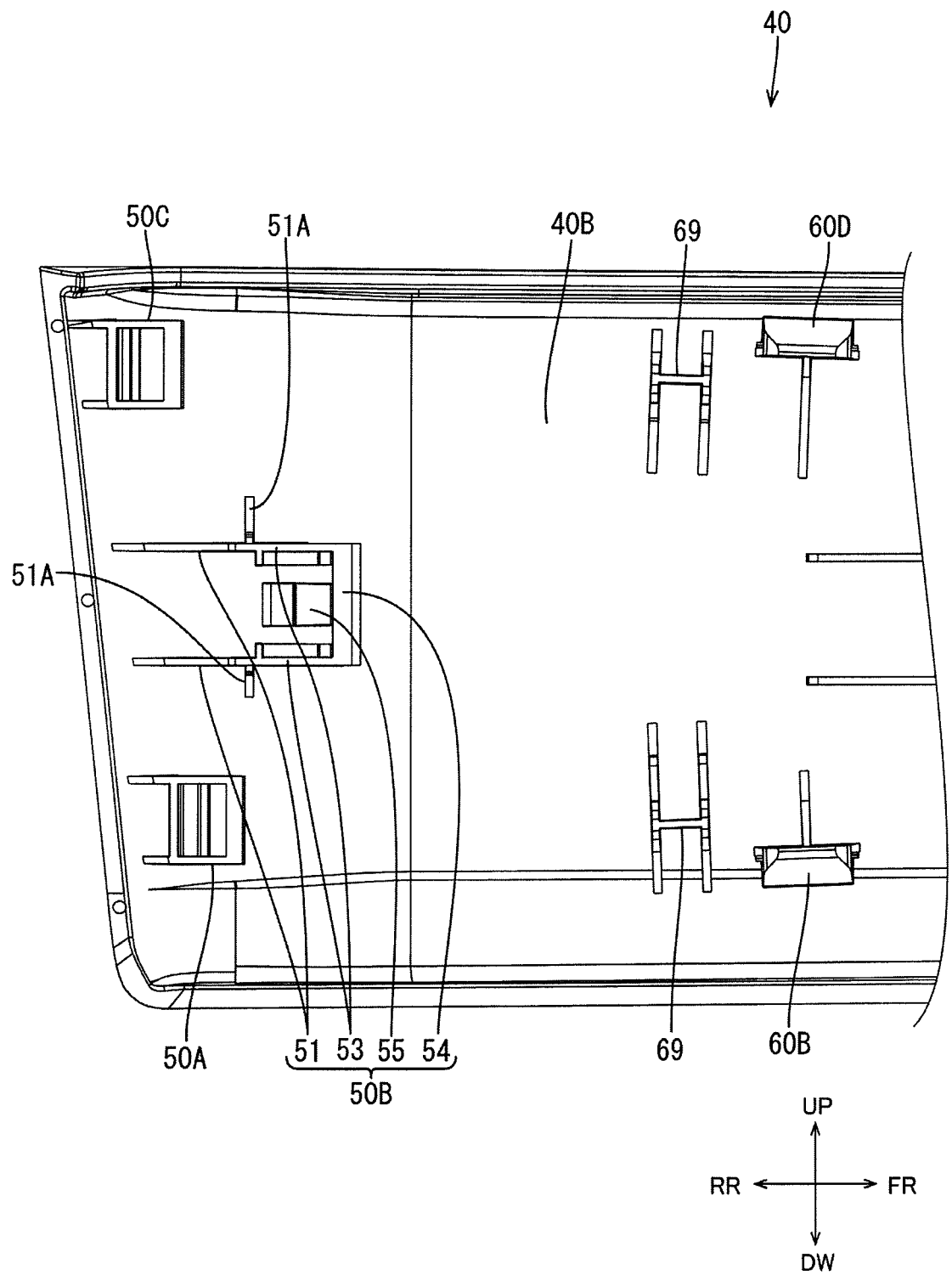
FIG. 4 is a magnified elevation view of a section of the back side of the interior component.
Figure 6:
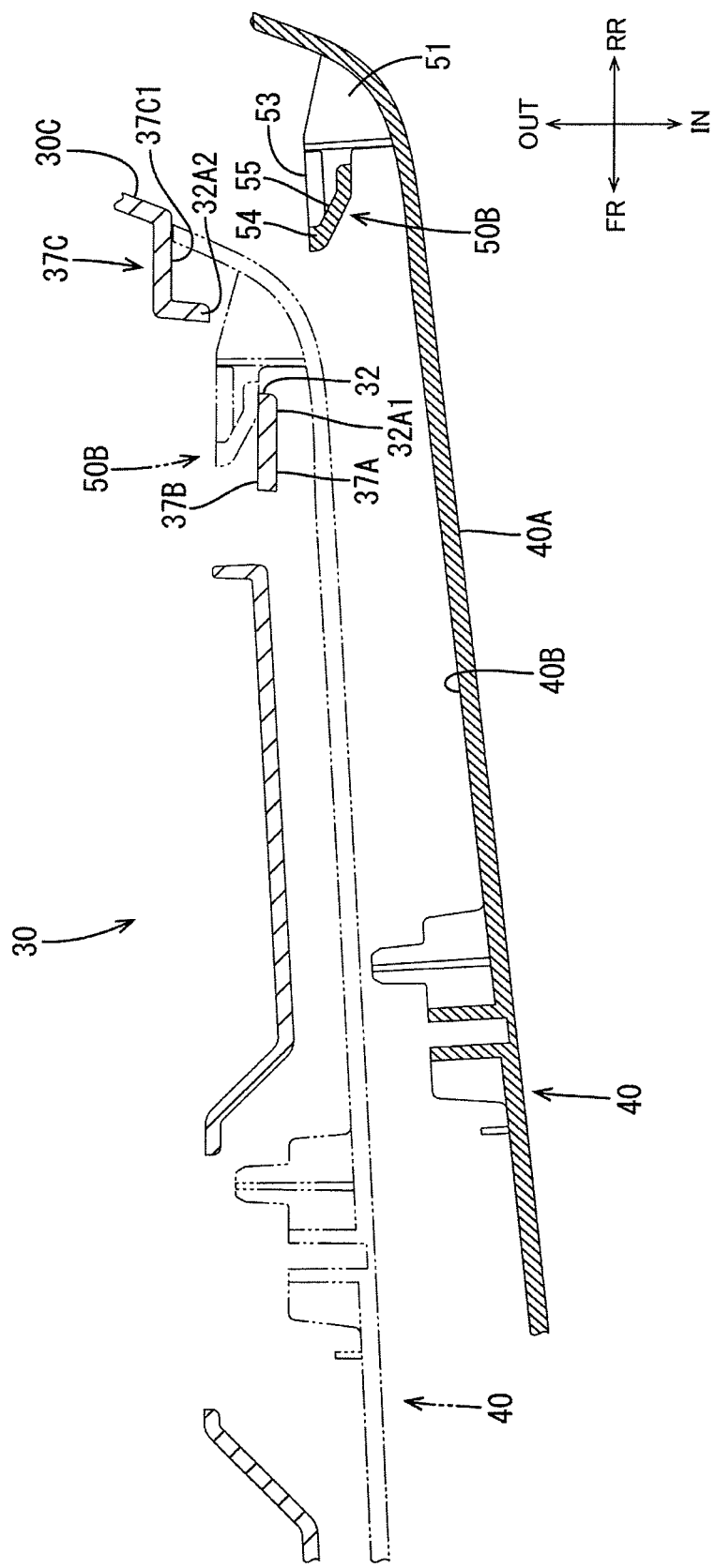
FIG. 6 is a cross-sectional view along line VI-VI in FIG. 5 illustrating a section of the door trim including a rear locking protrusion and a rear mounting hole.

The first rear locking protrusion 50A is disposed closer to the interior component rear edge 40C and the interior component lower edge 40E. The third rear locking protrusion 50C is disposed closer to the interior component rear edge 40C and the interior component upper edge 40D. The second rear locking protrusion 50B is disposed between the first rear locking protrusion 50A and the third rear locking protrusion 50C. The first rear locking protrusion 50A and the third rear locking protrusion 50C are curved to face the interior component back surface 40B. As illustrated in FIGS. 4 and 6, the second rear locking protrusion 50B includes projecting walls 51, extending portions 53, a beam portion 54, and a flexible tab 55.

The projecting walls 51 project from the interior component back surface 40B. The projecting walls 51 are elongated walls that extend in the front-rear direction of the vehicle. The projecting wall 51 are separated from each other in the top-bottom direction of the vehicle and opposed to each other. The projecting walls 51 include reinforcement ribs 51A. According to the shape and the reinforcement ribs 51A, the projecting walls 51 are less flexible than legs in the locking protrusion set 60, which will described later.

The extending portions 53 extend from distal ends of the projecting walls 51 toward the front of the vehicle. The beam portion 54 is coupled to distal ends of the extending portions 53 such that the extending portions 53 and the beam portion 54 define a rectangular C shape. The flexible tab 55 extends from the beam section 54 toward the interior component back surface 40B and bends toward the interior component rear edge 40C.

As illustrated in FIG. 3, the first locking protrusion 60A is disposed in a lower end section of the grip cover portion 42 (closer to a front end of the interior component 40). As illustrated in FIG. 7, the first locking protrusion 60A includes a mounting base 61 and a clip 63. The mounting base 61 is an arch-shaped protrusion on the interior component back surface 40B. The clip 63 is fixed to the mounting base 61. The clip 63 is prepared separately from the interior component 40. The clip 63 includes locks 63A that protrude toward the front side and the rear side of the vehicle, respectively. The clip 63 is flexible such that a dimension of the clip 63 in the front-rear direction of the vehicle can be altered.

Figure 8:
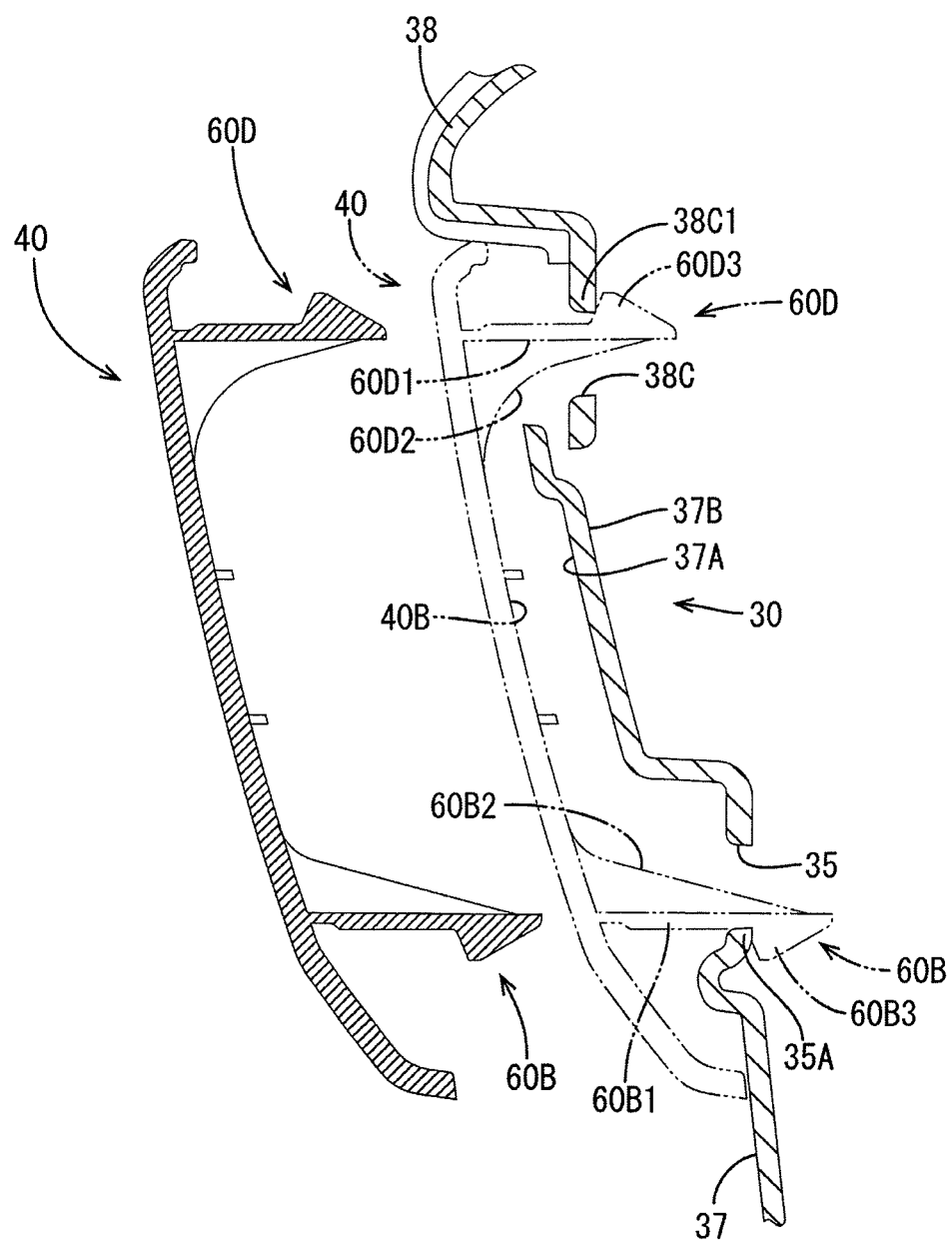
FIG. 8 is a cross sectional view along line VIII-VIII in FIG. 5 illustrating a section of the door trim including a locking protrusion and a mounting hole.

As illustrated in FIG. 8, the second locking protrusions 60B each include legs 60B1, reinforcement ribs 60B2, and locks 60B3. The legs 60B1 protrude from the interior component back surface 40B toward the door trim body 30. The legs 60B1 include base portions that have a thickness less than the thickness of the rest of portions of the legs 60B1. The reinforcement ribs 60B2 protrude from first plate surfaces of the respective legs 60B1 farther from the interior component lower edge 40E and from the interior component back surface 40B to reinforce the second locking protrusions 60B. The locks 60B3 protrude from second plate surfaces of the respective legs 60B1 opposite from the first plate surfaces.

As illustrated in FIG. 8, the fourth locking protrusions 60D each include legs 60D1, reinforcement ribs 60D2, and locks 60D3. Each leg 60D1 has a configuration similar to that of each leg 60B1 of each second locking protrusion 60B. The reinforcement ribs 60D2 protrude from first plate surfaces of the respective legs 60D1 farther from the interior component upper edge 40D and from the interior component back surface 40B to reinforce the fourth locking protrusions 60D. The locks 60D3 protrude from second plate surfaces of the respective legs 60D1 opposite from the first plate surfaces. Each third locking protrusion 60C has a configuration similar to that of the fourth locking protrusions 60D.

The interior component 40 further includes positioning protrusions 69 that protrude from the interior component back surface 40B. The positioning protrusions 69 include sidewalls and connecting walls. The sidewalls of each positioning protrusion 69 protrude from the interior component back surface 40B to be opposed to each other and the connecting wall of the positioning protrusion 69 connects one of the sidewalls to the other. The sidewalls of the positioning protrusions 69 disposed along the interior component lower edge 40E are formed in an L shape. Upper edges of distal ends of the sidewalls are lower than upper edges of base portion of the sidewall coupled to the interior component back surface 40B. The upper edges of the distal ends of the sidewalls are defined as supporting surfaces 69A.

As illustrated in FIG. 2, the trim board 37 includes a first rear mounting hole 31, a second rear mounting hole 32, a first mounting hole 34, second mounting holes 35, and third mounting holes 36. The first rear mounting hole 31 and the second rear mounting hole 32 in a section of in the trim board 37 opposed to a rear edge section of the interior component 40 including the interior component rear edge 40C. The first rear mounting hole 31 and the second rear mounting hole 32 are opposed to the first rear locking protrusion 50A and the second rear locking protrusion 50B, respectively. The first rear mounting hole 31 is located below the second rear mounting hole 32. The first mounting hole 34 is opposed to the first locking protrusion 60A of the interior component 40. The second mounting holes 35 are opposed to the second locking protrusions 60B of the interior component 40, respectively. The third mounting holes 36 are opposed to the third locking protrusions 60C of the interior component 40, respectively. The legs 60B1 have flexibility to deform toward the inside of the respective second mounting holes 35 during insertion of the locks 60B3 into the second mounting holes 35, respectively. The legs of the third locking portions 60C have flexibility to deform toward the inside of the respective third mounting holes 36 during insertion of the locks into the third mounting holes 36, respectively.

As illustrated in FIG. 2, the ornament board 38 includes a third rear mounting hole 38B and fourth mounting holes 38C. The third rear mounting hole 38B is located opposite the third rear locking protrusion 50C of the interior component 40 and above the second rear mounting hole 32. The fourth mounting holes 38C are located opposite the fourth locking protrusions 60D of the interior component 40 and closer to the third rear mounting hole 38B relative to the third mounting holes 36.

As illustrated in FIGS. 6 and 7, the trim board 37 includes a back surface that faces the door panel 12. The back surface of the trim board 37 will be referred to as a trim board back surface 37B. The trim board 37 further includes a projecting portion 37C that projects from the trim board back surface 37B. The projecting portion 37C includes an opposed wall 37C1 that is opposed to the door panel 12. The opposed wall 37C1 extends from a sidewall 30C of the door trim body 30 at an angle. The opposed wall 37C1 is disposed on the inner side of the vehicle interior relative to the sidewall 30C.

As illustrated in FIGS. 2 and 6, the second rear mounting hole 32 includes a first section formed in the projecting portion 37C and a second section formed in a section of the trim board 37 adjacent to the projecting portion 37C to open in the front-rear direction and the top-bottom direction of the vehicle. The second rear mounting hole 32 has a rectangular shape when viewed in the width direction of the vehicle. The second rear mounting hole 32 includes a hole edge 32A including a front hole edge section 32A1 adjacent to the projecting portion 37C and a rear hole edge section 32A2 in the projecting portion 37C. The front hole edge section 32A1 is located closer to the front of the vehicle relative to the rear hole edge section 32A2. The extending portions 53 of the second rear locking protrusion 50B are held against the front hole edge section 32A1. The projecting walls 51 of the second rear locking protrusion 50B extend along upper and lower sections of the hole edge 32A. The flexible tab 55 is designed to hold to a section of the front hole edge section 32A1 when the extending portions 53 are inserted in the second rear mounting hole 32.

As illustrated in FIGS. 2 and 7, the first mounting hole 34 is a through hole formed in a section of the trim board 37 to be opposed to the lower end section 21B of the door grip 21. The first mounting hole 34 includes a rectangular first mounting hole edge 34A that includes a front edge section and a rear edge section located closer to the front of the vehicle and the rear of the vehicle, respectively. The first locking protrusion 60A is locked to the front edge section and the rear edge section of the first mounting hole edge 34A.

As illustrated in FIGS. 2 and 8, the second mounting holes 35 and the third mounting holes 36 are through holes formed in sections of the trim board 37 opposed to an upper edge section of the interior component 40 adjacent to the interior component upper edge 40D and a lower edge section of the interior component 40 adjacent to the interior component lower edge 40E, respectively. The second mounting holes 35 include rectangular second mounting hole edges 35A. The hole edge 35A of each second mounting hole 35 has a long dimension in the front-rear direction of the vehicle. Each second mounting hole 35 collectively holds the corresponding second locking protrusion 60B and the corresponding positioning protrusion 69. Each third mounting hole 36 includes rectangular third mounting hole edge 36A in the trim board front surface 37A of the trim board 37. Each third mounting hole 36 collectively holds the corresponding third locking protrusion 60C and the corresponding positioning protrusion 69. The positioning protrusions 69 are held in the second mounting holes 35, the third mounting holes 36, and the fourth mounting holes 38C to define positions of the second locking protrusions 60B, the third locking protrusions 60C, and the fourth locking protrusions 60D in the respective mounting holes 35, 36, and 38C to maintain the second locking protrusions 60B, the third locking protrusions 60C, and the fourth locking protrusions 60D in locked positions. The second mounting hole edges 35A are supported by the supporting surfaces 69A of the positioning protrusions 69 adjacent to the second locking protrusions 60B.

The first rear locking protrusion 50A, the second rear locking protrusion 50B, and the third rear locking protrusion 50C are slid into the first rear mounting hole 31, the second rear mounting hole 32, and the third rear mounting hole 38B along the front surface 30A of the door trim body 30 and locked to a first rear mounting hole edge 31A, the front hole edge section 32A1, and a third rear mounting hole edge 38B1, more specifically, to sections of the first rear mounting hole edge 31A, the front hole edge section 32A1, and the third rear mounting hole edge 38B1 farther from the interior component rear edge 40C. The first locking protrusion 60A, the second locking protrusions 60B, the third locking protrusions 60C, and the fourth locking protrusions 60D are inserted into the first mounting hole 34, the second mounting holes 35, the third mounting holes 36, and the fourth mounting holes 38C in the direction that crosses the front surface 30A of the door trim body 30. During the insertion, the first locking protrusion 60A, the second locking protrusions 60B, the third locking protrusions 60C, and the fourth locking protrusions 60D deform. When the first locking protrusion 60A, the second locking protrusions 60B, the third locking protrusions 60C, and the fourth locking protrusions 60D return to their original states, they are locked to the first mounting hole edge 34A, the second mounting hole edges 35A, the third mounting hole edges 36A, and fourth mounting hole edges 38C1, respectively. How the interior component 40 is mounted to the door trim body 30 will be described with reference to FIGS. 6 to 8. In FIGS. 6 and 8, the interior component 40 before mounted to the door trim body 30 is indicated with solid lines and the interior component 40 mounted to the door trim body 30 is indicated with two-dashed chain lines.

The door trim body 30 is attached to the door panel 12 with clips. The screws 14 are inserted in the insertion holes 39A in the fixing portions 39 of the door trim body 30. The screws 14 are screwed into grommets in the door trim 20.

As illustrated in FIG. 5, the interior component 40 is held in an angled position such that the interior component rear edge 40C is closer to the front surface 30A of the door trim body 30 and more to the rear side of the vehicle than the rear edge of the door trim body 30. As illustrated in FIG. 6, the interior component 40 is slid along the front surface 30A of the door trim body 30 toward the front side of the vehicle until the second rear locking protrusion 50B in inserted in the second rear mounting hole 32. The second rear locking protrusion 50B is locked to the front hole edge section 32A1. Specifically, the extending portions 53 are held against the front hole edge section 32A1 of a back surface 30B of the door trim body 30 to restrict displacement of the interior component 40 toward the inner side of the vehicle interior. The projecting walls 51 contact an inner wall of the second rear mounting hole 32 to restrict displacement of the interior component 40 toward the front of the vehicle. Furthermore, the flexible tab 55 is deformed to contact the front hole edge section 32A1 of the back surface 30B and a force is exerted on the interior component 40 toward the exterior of the vehicle. The interior component rear edge 40C contacts the opposed wall 37C1 of the door trim body 30 and thus the interior component rear edge 40C is less likely to rattle. The first rear locking protrusion 50A and the third rear locking protrusion 50C are inserted in the first rear mounting hole 31 and the third rear mounting hole 38B and locked to the first rear mounting hole edge 31A and the third rear mounting hole edge 38B1, respectively. When the interior component 40 is in this position, the front portion of the interior component 40 is separated from the door trim body 30.

The interior component 40 with the first rear locking protrusion 50A, the second rear locking protrusion 50B, and the third rear locking protrusion 50C in the first rear mounting hole 31, the second rear mounting hole 32, and the third rear mounting hole 38B is rotated toward the exterior of the vehicle with the rear edge of the interior component 40 as a rotation axis. As illustrated in FIGS. 7 and 8, the first locking protrusion 60A, the second locking protrusions 60B, third locking protrusions 60C, and the fourth locking protrusions 60D are brought closer to the door trim body 30 and distal ends of the first locking protrusion 60A, the second locking protrusions 60B, third locking protrusions 60C, and the fourth locking protrusions 60D are inserted in the first mounting hole 34, the second mounting holes 35, the third mounting holes 36, and the fourth mounting holes 38C, respectively. The distal ends of the first locking protrusion 60A, the second locking protrusions 60B, third locking protrusions 60C, and the fourth locking protrusions 60D are locked to the hole edges of the first mounting hole 34, the second mounting holes 35, the third mounting holes 36, and the fourth mounting holes 38C, respectively. Because the first rear locking protrusion 50A, the second rear locking protrusion 50B, and the third rear locking protrusion 50C are inserted in the first rear mounting hole 31, the second rear mounting hole 32, and the third rear mounting hole 38B, the first locking protrusion 60A, the second locking protrusions 60B, third locking protrusions 60C, and the fourth locking protrusions 60D are properly positioned relative to the first mounting hole 34, the second mounting holes 35, the third mounting holes 36, and the fourth mounting holes 38C. Therefore, the first locking protrusion 60A, the second locking protrusions 60B, third locking protrusions 60C, and the fourth locking protrusions 60D are easily inserted into the first mounting hole 34, the second mounting holes 35, the third mounting holes 36, and the fourth mounting holes 38C.

When the distal end of the first locking protrusion 60A is inserted in the first mounting hole 34, the locks 63A are pressed against the first mounting hole edge 34A of the first mounting hole 34. As a result, the clip 63 deforms in the radial direction of the clip 63 and the locks 63A pass through the first mounting hole 34. When the locks 63A reach the trim board back surface 37B of the trim board 37, the clip 63 returns to its original state and the locks 63A are locked to the first mounting hole edge 34A of the first mounting hole 34.

During insertion of the distal ends of the second locking protrusions 60B into the second mounting holes 35, the locks 60B3 are pressed against the second mounting hole edges 35A. The legs 60B1 deform toward the inner side of the interior component 40 and the locks 60B3 pass through the second mounting holes 35. When the locks 60B3 reach the trim board back surface 37B of the trim board 37, the legs 60B1 return to their original state and the locks 60B3 are locked to sections of the second mounting hole edges 35A of the second mounting holes 35 closer to the interior component lower edge 40E. The corresponding positioning protrusions 69 are inserted in the second mounting holes 35 in which the corresponding second locking protrusions 60B are inserted. The surfaces of the positioning protrusions 69 and the supporting surfaces 69A contact inner walls of the respective second mounting holes 35 and define the positions of the second locking protrusions 60B.

In the same manner as the second locking protrusions 60B, the third locking protrusions 60C and the corresponding positioning protrusions 69 are inserted in the respective third mounting holes 36. The third locking protrusions 60C are locked to sections of the third mounting hole edges 36A closer to the interior component upper edge 40D. Furthermore, the fourth locking protrusions 60D and the corresponding positioning protrusions 69 are inserted in the respective fourth mounting holes 38C. The fourth locking protrusions 60D are locked to sections of the fourth mounting hole edges 38C1 closer to the interior component upper edge 40D. The surfaces of the positioning protrusions 69 contact inner walls of the respective third mounting holes 36 and the respective fourth mounting holes 38C and define the positions of the third locking protrusions 60C and the fourth locking protrusions 60D.

Effects will be described. In case of a side collision, a force may be applied to the door trim body 30 from the exterior side to the interior side and then to the interior component 40. Some of the first locking protrusion 60A, the second locking protrusions 60B, the third locking protrusions 60C, and the fourth locking protrusions 60D may be deformed and removed from the first mounting hole 34, the second mounting holes 35, the third mounting holes 36, or the fourth mounting holes 38C. Even in such a case, the first rear locking protrusion 50A, the second rear locking protrusion 50B, and the third rear locking protrusion 50C remain in the first rear mounting hole 31, the second rear mounting hole 32, and the third rear mounting hole 38B. Namely, the interior component 40 comes off the door trim body 30 as intended.

A rear portion of the interior component 40 including the interior component rear edge 40C is more likely to be opposed to a side of the body of the passenger. According to the mounting structure of mounting the interior component 40 to the door trim body 30, the rear portion of the interior component 40 is more likely to remain fixed to the door trim body 30 even in a side collision. Therefore, scores of injury criteria for side collisions can be reduced. Furthermore, because the rear portion of the interior component 40 is less likely to come off the door trim body 30, the interior component 40 is less likely to obstruct deployment of a side airbag disposed closer to the rear of the vehicle relative to the interior component 40. The mounting structure of mounting the interior component 40 to the door trim body 30 controls the removal of the interior component 40. Therefore, special parts such as tether clips are not required. According to the configuration, the number of parts and the production cost can be reduced.

The second rear locking protrusion 50B is inserted into the second rear mounting hole 32 that is formed in the projecting portion 37C. The projecting portion 37C includes the opposed wall 37C1 including the section of the second rear mounting hole 32 opening in the front-rear direction of the vehicle. The second rear locking protrusion 50B is inserted into the second rear mounting hole 32 from the rear side of the vehicle relative to the opposed wall 37C1 and held to the front hole edge section 32A1. According to the configuration, even if the deployed side airbag contacts the rear edge portion of the interior component 40, the interior component 40 is less likely to receive a force with which the second rear locking protrusion 50B is removed from the second rear mounting hole 32. Therefore, the second rear locking protrusion 50B is properly held in the second rear mounting hole 32.

The interior component 40 is fixed to the door trim body 30 to cover the fixing portions 39. Namely, the interior component 40 is mounted to the door trim body 30 after the door trim body 30 is mounted to the door panel 12. A mounting structure including fixing portions to fix the interior component 40 to the door trim body 30 from the exterior side cannot be used. The mounting structure according to this embodiment is especially effective because the interior component 40 is mounted to the door trim body 30 to cover the fixing portions 39 with which the door trim body 30 is fixed to the door panel 12. In comparison to a door trim including fixing portions that are exposed or covered with caps, the decorative aspect of the door trim 20 improves.

The fixing portions 39 are disposed at the upper end section 21A and the lower end section 21B of the door grip 21, respectively. The interior component 40 includes the grip cover portion 42 including the front surface of the door grip 21 facing the interior of the vehicle interior and the base portion 43 that extends from the lower end portion 21B toward the rear side of the vehicle. With the fixing portions 39, the door grip 21 is provided with adequate strength. Furthermore, according to the configuration of the interior component 40, the door grip 21 is well matched with other portions of the interior component 40 having other functions and thus the door trim 20 has a sense of unity.

Other Embodiments

The technology described herein is not limited to the embodiment described in the above description and the drawings. The technology described herein may include the following embodiments.

(1) The technology described herein may be applied to other types of covers that cover fixing portions of door trim bodies and other types of decorative components. Furthermore, the technology described herein may be applied to interior components with shapes, arrangements, and configurations different from those of the interior component 40.

(2) The technology described herein may be applied to a door trim body and a grip base that are separate components.

(3) The shapes, the arrangement, and the numbers of the first rear locking protrusion 50A, the second rear locking protrusion 50B, and the third rear locking protrusion 50C may be altered where appropriate. The technology described herein may be applied to a configuration that includes a rear locking protrusion inserted in a rear mounting hole from an upper side of a vehicle and locked to a lower edge of the rear mounting hole.

(4) The shapes, the arrangement, and the numbers of the first locking protrusion 60A, the second locking protrusions 60B, the third locking protrusions 60C, and the fourth locking protrusions 60D may be altered where appropriate. The technology described herein may be applied to an interior component that includes locking protrusions including legs and locks.

The invention claimed is:

1. A mounting structure for mounting an interior component having an elongated shape with a long dimension in a front-rear direction of a vehicle to a door trim body in the vehicle, the mounting structure comprising:
   at least one rear locking protrusion including a first portion protruding from a back surface of the interior component opposed to the door trim body and a second portion extending from a distal end of the first portion toward a front of the vehicle, the at least one rear locking protrusion being disposed closer to a rear edge of the interior component than to a front end of the interior component;
   at least one rear mounting hole in a rear edge section of the door trim body and opposed to the at least one rear locking protrusion;
   at least one locking protrusion protruding from the back surface of the interior component toward the door trim body, the at least one locking protrusion being disposed at a position closer to a front of the vehicle relative to the at least one rear locking protrusion; and
   at least one mounting hole in a section of the door trim body closer to the front of the vehicle relative to the at least one rear mounting hole and opposed to the at least one locking protrusion, wherein
   the first portion of the at least one rear locking protrusion is disposed in the at least one rear mounting hole and the second portion of the at least one rear locking protrusion is locked to a hole edge of the at least one rear mounting hole,
   the at least one locking protrusion is disposed in the at least one mounting hole and locked to a hole edge of the at least one mounting hole, and
   the at least one locking protrusion has flexibility to deform during insertion of the at least one locking protrusion in the at least one mounting hole with the at least one rear mounting protrusion disposed in the at least one rear mounting hole and to return to an original state thereof after passed through the at least one mounting hole.

2. The mounting structure according to claim 1, further comprising a projecting portion projecting from the back surface of the door trim body in the rear edge section of the door trim body, wherein
   the at least one rear mounting hole includes a section in the projecting portion to open in the front-rear direction of the vehicle,
   the first portion of the at least one rear locking protrusion is disposed in the section of the at least one rear mounting hole in the projecting portion, and
   the second portion of the at least one rear locking protrusion is locked to a section of the hole edge of the at least one rear mounting hole closer to the front of the vehicle relative to the section of the at least one rear mounting hole in the projecting portion.

3. The mounting structure according to claim 1, wherein
   the door trim body includes at least one fixing portion fixed to the door panel, and
   the interior component is mounted to the door trim body to cover the fixing portion.

4. The mounting structure according to claim 3, wherein
   the door trim body includes a door grip portion having an elongated shape,
   the at least one fixing portion includes two fixing portions disposed at ends of the door grip portion, respectively, and
   the interior component includes:
      a grip cover portion covering the door grip portion and including a front surface of a door grip including the door grip portion and the grip cover portion; and
      a base portion extending from the grip cover portion toward the rear of the vehicle.

5. The mounting structure according to claim 1, wherein
   the at least one rear locking protrusion includes a first rear locking protrusion, a second rear locking protrusion, and a third rear locking protrusion disposed along a rear edge of the interior component,
   the first rear locking protrusion is disposed closer to a lower edge of the interior component than to an upper edge of the interior component,
   the third rear locking protrusion is disposed closer to the upper edge of the interior component than to the lower edge of the interior component,
   the second rear locking protrusion is disposed between the first rear locking protrusion and the third rear locking protrusion,
   the at least one rear mounting hole includes a first rear mounting hole, a second rear mounting hole, and a third rear mounting hole opposed to the first rear locking protrusion, the second rear locking protrusion, and the third rear locking protrusion, respectively,
   the first rear locking protrusion is disposed in the first rear mounting hole and locked to a section of a hole edge of the first rear mounting hole farther from the rear edge of the interior component and closer to a front end of the interior component in the front-rear direction of the vehicle,
   the third rear locking protrusion is disposed in the third rear mounting hole and locked to a section of a hole edge of the third rear mounting hole farther from the rear edge of the interior component and closer to the front end of the interior component in the front-rear direction of the vehicle,
   the at least one locking protrusion includes a first locking protrusion, second locking protrusions, and third locking protrusions,
   the first locking protrusion is disposed closer to the front end of the interior component than the rear edge of the interior component,
   the second locking protrusions are disposed along the lower edge of the interior component,
   the third locking protrusions are disposed along the upper edge of the interior component,
   the at least one mounting hole includes a first mounting hole, second mounting holes, and third mounting holes,
   the first mounting hole is opposed to the first locking protrusion,
   the second mounting holes are opposed to the second locking protrusions, respectively, the third mounting holes are opposed to the third locking protrusions, respectively, the first locking protrusion is disposed in the first mounting hole and locked to sections of a hole edge of the first mounting hole separated from each other in the front-rear direction of the vehicle, the second locking protrusions are disposed in the second mounting holes, respectively, the second locking protrusions are locked to sections of hole edges of the second mounting holes closer to the lower edge of the interior component than to the upper edge of the interior component, the third locking protrusions are disposed in the third mounting holes, respectively, and the third locking protrusions are locked to sections of hole edges of the third mounting holes closer to the upper edge of the interior component than to the lower edge of the interior component.

6. The mounting structure according to claim 5, further comprising a projecting portion projecting from the back surface of the door trim body in the rear edge section of the door trim body, wherein the second rear mounting hole includes a section in the projecting portion to open in the front-rear direction of the vehicle, and the second rear locking protrusion includes a first portion disposed in the section of the second rear mounting hole in the projecting portion and a second portion locked to a section of a hole edge of the second rear mounting hole farther from the projecting portion in the front-rear direction of the vehicle.

7. The mounting structure according to claim 6, wherein the second rear locking protrusion includes:

projecting walls projecting from the back surface of the interior component toward the door trim body, the projecting walls being separated from each other in a top-bottom direction of the vehicle;

extending portions extending from distal ends of the projecting walls toward the front of the vehicle;

a beam portion coupled to distal ends of the extending portions; and a flexible tab extending from the beam portion toward the back surface of the interior component and bending toward the front of the vehicle, the flexible tab being included in the section of the second rear locking protrusion locked to the section of the hole edge of the second rear mounting hole farther from the projecting portion in the front-rear direction of the vehicle.

8. The mounting structure according to claim 5, wherein the door trim body includes at least one fixing portion fixed to the door panel, and the interior component is mounted to the door trim body to cover the fixing portion.

9. The mounting structure according to claim 8, wherein the door trim body includes a door grip portion having an elongated shape, the at least one fixing portion includes two fixing portions located at ends of the door grip portion, respectively, the interior component includes:

a grip cover portion covering the door grip portion and including a front surface of a door grip including the door grip portion and the grip cover portion; and a base portion extending from the grip cover portion toward the rear of the vehicle, and the first locking protrusion is disposed closer to one of the ends of the door grip portion that is closer to the base portion in the front-rear direction of the vehicle.

10. The mounting structure according to claim 5, wherein the door trim body includes a trim board and an ornament board including a design surface located adjacent to the interior component, the ornament board includes an edge section including an edge that overlaps an edge of the trim board and being disposed to cover the edge of the trim board, the interior component includes a fourth locking protrusion that protrudes from the back surface of the interior component toward the section of the ornament board, the edge section of the ornament board includes a fourth mounting hole opposed to the fourth locking protrusion, and the fourth locking protrusion is disposed in the fourth mounting hole and locked to a hole edge of the fourth mounting hole.

* * * * *